May 29, 1956 P. FATIO 2,747,400
APPARATUS FOR VOLUMETRIC MEASUREMENTS
Filed May 6, 1952 2 Sheets-Sheet 1
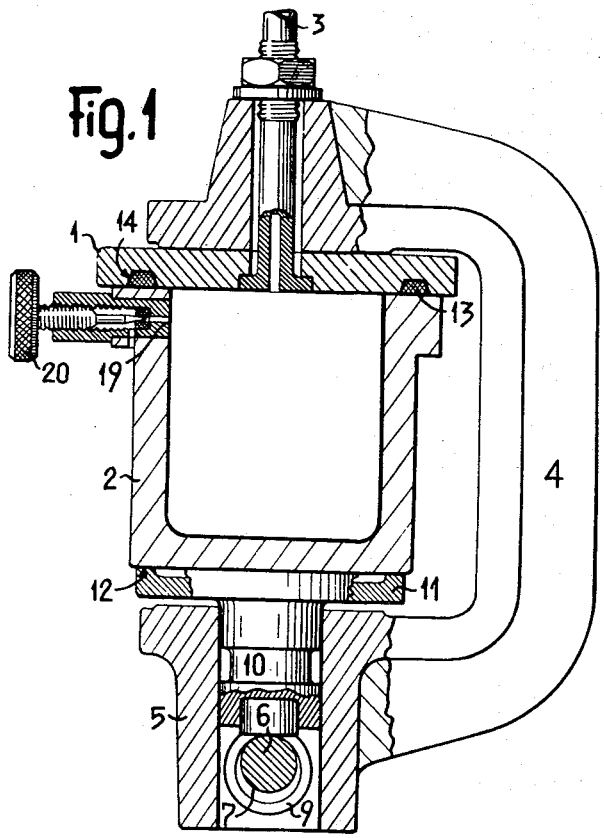
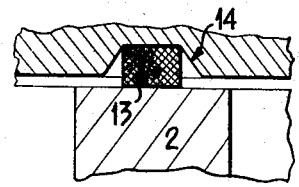
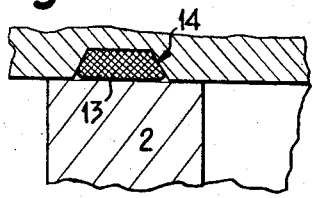
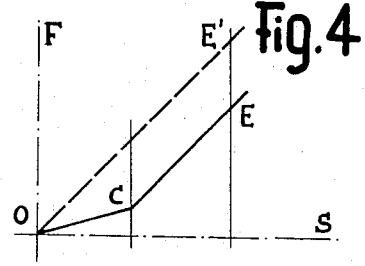
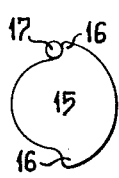
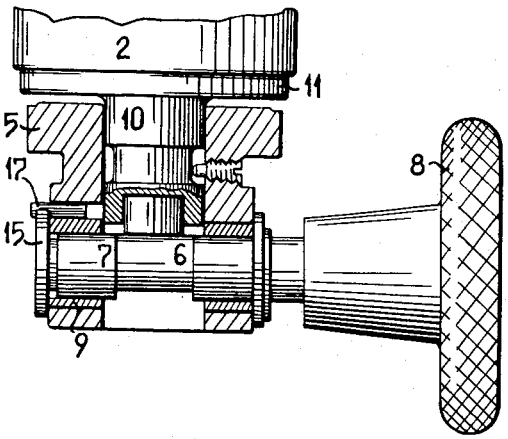
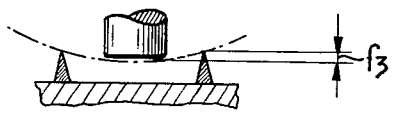
INVENTOR
Paul Fatio
BY
ATTORNEY United States Patent Office 2,747,400
Patented May 29, 1956

2,747,400

APPARATUS FOR VOLUMETRIC MEASUREMENTS

Paul Fatio, Bellevue, Geneva, Switzerland

Application May 6, 1952, Serial No. 286,310

6 Claims. (Cl. 73—149)

Apparatus for volumetric measurements are known in which a container adapted for measurements is connected to a pressure-gauge in combination with a device for creating pressure in the container. An apparatus of this kind is shown diagrammatically in Fig. 11 of the accompanying drawing.

In this figure, A represents the measuring container, B a pressure-gauge and C a device for creating pressure in the container A. This device is constituted by a cylinder filled, for example, with mercury and in which moves, with clearance, a piston.

In known apparatus of this kind, the mounting of the measuring container and the clamping members designed to ensure its tightness do not allow rapid withdrawal and setting of the container, which slows down the measuring operations.

The present invention has for its object the removal of this drawback. To this end, the cylindrical container is provided with relatively thick walls, and the clamping members are arranged on a support integral with the cover of the container so as to act flexibly on the base of the container.

The accompanying drawing shows, by way of example two embodiments of the object of the invention.

Fig. 1 is an axial section of the part of the apparatus carrying the container, of a first embodiment of the apparatus.

Figs. 2 and 3 are detail views to a larger scale.

Fig. 4 is a diagram of the closing force in terms of the closing path travelled by the container.

Fig. 5 is an axial section of the lower part of the container, perpendicular to that shown in Fig. 1.

Fig. 6 is a diagram of the flexion of the eccentric shaft.

Fig. 7 is a view of the angular abutment of the eccentric shaft.

Figure 8:
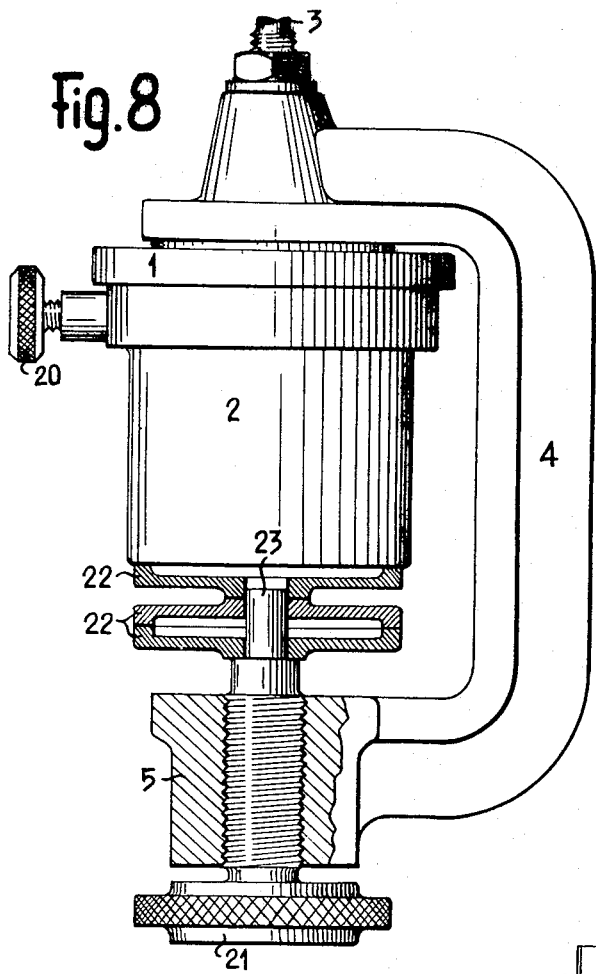
Fig. 8 is a section corresponding to that of Fig. 1, of a second embodiment of the apparatus.

Referring to Figs. 1 to 6, the apparatus includes a member 1 forming a cover for a container 2 of cylindrical shape, with relatively thick walls. This cover 1 is integral with the frame of the apparatus (not shown) and connected by a pipe 3 to a pressure-gauge and to a device for creating pressure in the container 2. The cover carries a support 4 constituted by a curved U-shaped arm the free end 5 of which is arranged to project beneath and opposite to the cover 1, as shown in Figure 1. The support 4 is located in a vertical plane passing through the center of the cover 1. The end 5 of the support 4 carries an eccentric 6, mounted on a horizontal shaft 7 controlled by a handle 8, and rotating in two bearings 9 arranged at a certain distance one from the other.

The eccentric 6 acts on a piston 10 sliding in the end 5 of the support 4 and carrying a plate 11, the upper face of which forms a cup, so that it only engages the container 2 through its peripheral part 12.

The eccentric shaft 7 carries a small plate 15 provided with two abutments 16 arranged at 180° one to another and engaging a lug 17 at the end 5 of the support 4 (Fig. 7).

The cover 1 is provided, on its surface in contact with the edge of the container 2 in the closed position, with a flexible gasket 13 situated in a circular groove 14 (Figs. 2 and 3). This latter has a larger cross section than that of the gasket it accommodates. When this gasket 13, which normally projects out of the cover 1 (Fig. 2), is deformed through compression, it may therefore enter completely into the groove 14 (Fig. 3). In the closed position, the edge of the container 2 is in contact with the cover 1 on both sides of the groove 14 (Figs. 1 to 3).

Fig. 1 shows the container 2 in the closed position, the eccentric 6 being blocked in its upper dead center position. If the support 4 of the eccentric were quite rigid, the eccentric would exert upwardly an unceasing force, which would result in immediate wear of its contact surface; in order that this should not be the case, the support 4 for the bearings 9 of the shaft 7 of the eccentric 6 has a U or stirrup shape, that is to say a flexible shape in the direction of the vertical axis. (See the deformations indicated in Fig. 9.) To the same end, the bearings 9 of the shaft 7 of the eccentric 6 are relatively separated one from the other so that the shaft may bend; furthermore, the upper face of the plate 11 is hollow, and presses against the container through its peripheral part. As for the container 2 proper, its side walls are relatively thick, so that clamping only produces a negligible deformation with respect to the total amount of the deformations of the stirrup 4, of the shaft 7 of the eccentric 6 and of the clamping plate 11.

The interior of the container is connected to the atmosphere by a bore 19 closed by a needle-valve 20.

Fig. 2 shows the upper face of the container 2 at the start of closing; this face is beginning to compress the flexible annular gasket 13 in its housing 14, the volume of which is greater than the volume of the joint.

Fig. 3 shows the gasket 13 compressed; in this position it exerts a force which tends to separate the container 2 from the cover 1, and opposes the force exerted by the eccentric.

Fig. 4 is a diagram showing the graph of the closing force in terms of the vertical stroke of the upper face or tightness face of the container 2; at O this face enters into contact with the gasket, and compresses it from O to C; since the gasket is made of rubber, its flexibility characteristic is fairly flat. At C the gasket is compressed and forced into its housing; the upper face of the container enters into contact with the corresponding face of the fixed cover 1, and the two faces are pressed one against the other by the eccentric up to E, which provides the additional force necessary to realize perfect tightness. The dotted line O—E' would be the compression characteristic if the gasket 13 were not compressible.

To sum up, the line O—C represents the characteristic of the device during the compression of the flexible gasket, whereas the line C—E represents that of the same device, after the gasket has been compressed, the metallic faces being in contact.

Fig. 5 shows the fairly large distance apart of the bearings 9 of the shaft 7 of the eccentric 6, which makes the latter flexible, as shown diagrammatically in Fig. 6. In this figure, $f_3$ is the sag of the shaft in the median plane of the eccentric. Due to the devices 15, 16, 17 shown in Figs. 5 and 7, which determines the high and low positions of the eccentric 6, at each closure the container 2 is always pressed against its cover 1 with the same force.

Fig. 8 shows a second embodiment. The arrangement of the cover 1, of the container 2 and of the support 4 is identical to that described with reference to Fig. 1 but the eccentric and its shaft are replaced by an abutment screw 21 acting on the container 2 through several flexible washers 22 or plates centered on an extension 23 of the screw 21. When the head of the screw 21 abuts against its support 5, the force exerted by the latter must be sufficient to ensure the perfect tightness of the container 2.

Figure 9:
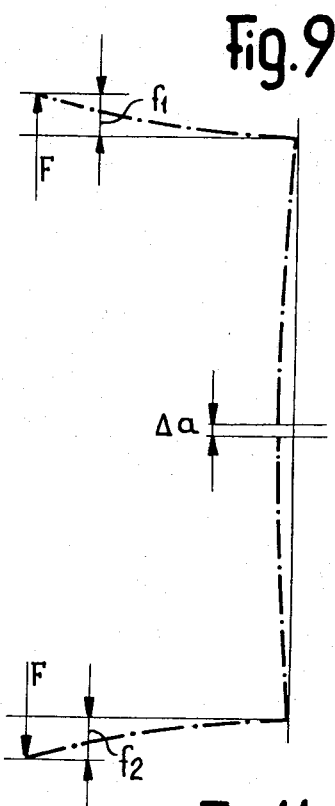
Fig. 9 is a diagram showing the flexible deformations of the support of the clamping member.

Fig. 9 shows the flexible deformation of the neutral fibre of the support 4; this neutral fibre is shown by a dot and dash line. To the flexions $f_1$ and $f_2$ of the two horizontal branches of the support 4 is to be added the extension $\Delta a$ of its vertical part. In this figure, $f_1$ represents the sagging of the upper horizontal branch of the support 4, $f_2$ represents the sagging of the lower horizontal branch, while $\Delta a$ represents the extension of the vertical branch.

Figure 10:
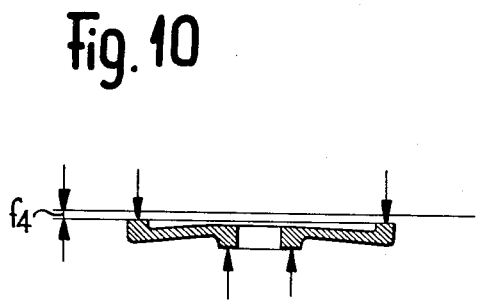
Fig. 10 is a diagram showing the flexible deformation of the washers which are interposed between the clamping member and the container.

Fig. 10 shows how the washers 22 are compressed. Of course, the flexibility of the device may be increased at will by increasing the number of washers; $f_4$ represents the sagging of a flexible washer.

According to the invention, the container 2, with thick walls, only undergoes in the axial direction, under the action of the closing force, a negligible deformation relative to the total amount of the deformations $$f_1+f_2+\Delta a+f_3+f_4$$

Figure 11:
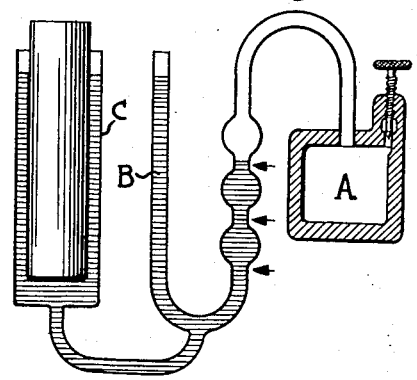
Fig. 11 is an explanatory diagram.

The operation of the apparatus is as follows, referring to Fig. 11 of the drawing:

To each size of the container A, corresponds, on the pressure-gauge, an indicating mark designated by the arrows to the left of the container. The pressure-gauge B comprises a graduated scale (not shown in the drawing).

The principle of the apparatus is based on Boyle-Mariotte's law according to which, at constant temperature, the volume of a mass of gas is inversely proportional to its pressure. In order to carry out a measurement, it is sufficient to operate two consecutive compressions by means of the device C, one with the container A empty, the other with the container containing the material of which the volume is to be determined. These two compressions allow reading on the scale of the pressure-gauge two pressures, viz.: $h_0$ for the container A empty and $h_1$ for the container charged. The volume of the material contained in the container A is determined by the formula $$X=K\frac{h_1-h_0}{h_1} \text{ cm.}^3$$

in which K is a gauging constant, which corresponds to the total volume of container A empty with its communicating passages up to the indicating mark designated by the arrow to the left of the container.

For a measurement, one thus proceeds in the following manner:

A first reading is made on the scale of the pressure-gauge B with the container A empty. The material to be measured is then introduced into the said container and the second reading is made on the scale of the pressure-gauge B, which permits determining the exact volume of the material in question.

For all the reading operations on the pressure-gauge B, the container A must obviously always be applied in a watertight manner, with the same force against the support of the apparatus. On the other hand, the placing of the said container and its removal must be made easily and rapidly. This is the object of the invention.

I claim:

1. In an apparatus for volumetric measurements comprising a container, a means for creating a pressure in said container, a pressure gauge connected to said container and to said pressure creating means therefor, and a clamping means for closing said container, the improvements comprising, in combination, a thick-walled container, a cover for said container, said cover having a groove on that portion of its surface contacting the top surface of said container walls, a flexible gasket positioned in said groove contacting the top surface of the container walls, said groove being of a volume at least equal to the volume of said gasket, whereby said gasket cannot be compressed beyond its elastic limit, thereby preventing permanent deformation of said gasket, a U-shaped arm support integral with said cover and laterally open with respect to said container walls, and a first means projecting beneath said container and positioned opposite to said cover for producing a clamping force by said container against said cover greater than that necessary for compressing the said gasket between the container walls and said cover, said first means including a vertically movable flexible plate having a hollow cup-shaped upper portion and peripheral portions forming the walls of said cup-shaped upper portion, said peripheral portions being in contact with the base portion of said container at points thereon opposite to said gasket positioned in said groove of said cover, said first means being integral with said support and including a second means for producing a flexible deformation of said portion of said first means, whereby the container is tightly closed by said cover and is negligibly deformed.

2. The apparatus of claim 1 wherein the groove is of greater volume than the gasket positioned therein and the gasket projects out of said groove, whereby, when said container is clamped against said cover, said container first engages said gasket and after compression of said gasket said container engages said cover on both sides of said gasket in said groove, and the container is negligibly deformed.

3. The apparatus of claim 1 wherein said second means includes an eccentric means mounted to turn about a horizontal axis for moving said movable member vertically, whereby said container is forced against said cover.

4. In an apparatus for volumetric measurements comprising a container, a means for creating a pressure in said container, a pressure gauge connected to said container and to said pressure creating means therefor, and a clamping means for closing said container, the improvements comprising, in combination, a thick walled container, a cover for said container, said cover having a groove on that portion of its surface contacting the top surface of said container walls, a flexible gasket positioned in said groove contacting the top surface of the container walls, said groove being of a volume at least equal to the volume of said gasket, whereby said gasket cannot be compressed beyond its elastic limit, thereby preventing permanent deformation of said gasket, a U-shaped arm support integral with said cover and laterally open with respect to said container walls, and a first means projecting beneath said container and positioned opposite to said cover for producing a clamping force by said container against said cover greater than that necessary for compressing the said gasket between the container walls and said cover, said first means including a vertically movable flexible plate having a hollow cup-shaped upper portion and peripheral portions forming the walls of said cup-shaped upper portion, said peripheral portions being in contact with the base portion of said container at points thereon opposite to said gasket positioned in said groove of said cover, said first means being integral with said support and including a second means for producing a flexible deformation of said first means, said second means including a flexible shaft having a horizontal axis and an eccentric means mounted on said shaft to turn about said horizontal axis for flexibly pressing said container against said cover, said second means being operatively connected to said flexible plate, whereby the container is tightly closed by said cover and is negligibly deformed.

5. The apparatus of claim 4 wherein said second means also includes a control handle means for turning said shaft and said eccentric means about said horizontal axis, said handle means being operatively connected to said shaft at one end portion thereof, and an angular abutment means mounted on said shaft and the other portion thereof for controlling the distance through which the handle is moved, whereby a constant compression of said gasket is produced, said second means being operatively connected to said flexible plate.

6. In an apparatus for volumetric measurements comprising a container, a means for creating a pressure in said container, a pressure gauge connected to said container and to said pressure creating means therefor, and a clamping means for closing said container, the improvements comprising, in combination, a thick-walled container, a cover for said container, said cover having a groove on that portion of its surface contacting the top surface of said container walls, a flexible gasket positioned in said groove contacting the top surface of the container walls, said groove being of a volume at least equal to the volume of said gasket, whereby said gasket cannot be compressed beyond its elastic limit, thereby preventing permanent deformation of said gasket, a U-shaped arm support integral with said cover and laterally open with respect to said container walls, and a first means projecting beneath said container and positioned opposite to said cover for producing a clamping force by said container against said cover greater than that necessary for compressing the said gasket between the container walls and said cover, said first means including a vertically movable flexible plate having a hollow cup-shaped upper portion and peripheral portions forming the walls of said cup-shaped upper portion, said peripheral portions being in contact with the base portion of said container at points thereon opposite to said gasket positioned in said groove of said cover, said first means being integral with said support and including a second means for producing a flexible deformation of said portion of said first means, said second means including an abutment screw means co-axial with said container for acting on said container through said flexible plate, said screw means being operatively mounted on said arm support, whereby the container is tightly closed by said cover and is negligibly deformed.

References Cited in the file of this patent

UNITED STATES PATENTS

| | | |
|---|---|---|
| 1,017,704 | Tallman | Feb. 20, 1912 |
| 1,151,007 | Goodrich | Aug. 24, 1915 |
| 1,431,704 | Smith | Oct. 10, 1922 |
| 1,571,958 | Mueller et al. | Feb. 9, 1926 |
| 2,391,351 | Schmidt | Dec. 18, 1945 |
| 2,667,782 | Shea | Feb. 2, 1954 |

FOREIGN PATENTS

| | | |
|---|---|---|
| 411,496 | Italy | Aug. 9, 1945 |
| 912,062 | France | Apr. 15, 1946 |